US009653892B2

(12) United States Patent
Guering

(10) Patent No.: US 9,653,892 B2
(45) Date of Patent: May 16, 2017

(54) ASSEMBLY OF COMPACTLY INTEGRATED CONTACTORS IN AN ELECTRICAL CORE

(71) Applicant: Airbus Operations S.A.S., Toulouse (FR)

(72) Inventor: Bernard Guering, Montrabe (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 63 days.

(21) Appl. No.: 14/311,664

(22) Filed: Jun. 23, 2014

(65) Prior Publication Data

US 2014/0301023 A1 Oct. 9, 2014

Related U.S. Application Data

(63) Continuation of application No. PCT/FR2012/053087, filed on Dec. 27, 2012.

(30) Foreign Application Priority Data

Dec. 29, 2011 (FR) ...................................... 11 62544

(51) Int. Cl.
*H02B 1/04* (2006.01)
*H02B 1/056* (2006.01)
(Continued)

(52) U.S. Cl.
CPC ................. *H02B 1/24* (2013.01); *H02B 1/04* (2013.01); *H02B 1/056* (2013.01); *H02B 1/20* (2013.01)

(58) Field of Classification Search
CPC . H02B 1/04; H02B 1/056; H02B 1/20; H02B 1/24
See application file for complete search history.

(56) References Cited

U.S. PATENT DOCUMENTS 5,466,974 A 11/1995 Sutrina et al.
5,594,285 A * 1/1997 Wisbey .................. B64D 41/00
307/18

(Continued)

FOREIGN PATENT DOCUMENTS

DE 202010004061 U1 6/2010
FR 1329862 A 6/1963
FR 2614478 A1 10/1988

OTHER PUBLICATIONS

International Searching Authority, International Search Report for International Application No. PCT/FR2012/053087, mailed Apr. 22, 2013.

*Primary Examiner* — Robert J Hoffberg
(74) *Attorney, Agent, or Firm* — Lorenz & Kopf, LLP.

(57) ABSTRACT

An electrical core comprising an assembly of power management and distribution contactors is provided. The power management contactors are attached to a first support element and the distribution contactors are carried by a second support element superimposed on the first so as to form a multilayer assembly. The distribution contactors are arranged in double symmetry about two axes perpendicular to one another. They are mechanically linked through a mechanical linkage element extending between two rows of contactors and which carries electrical connection elements connecting the contactors to an element for connecting to a power source. The contactors are assembled in modules according to their type. In particular, the management module comprises at least one modular element common to the power management contactors which is suitable for performing a given secondary function other than the function of establishing a contact.

18 Claims, 5 Drawing Sheets

(51) Int. Cl.
*H02B 1/24* (2006.01)
*H02B 1/20* (2006.01)

(56) References Cited

U.S. PATENT DOCUMENTS

| | | | | |
|---|---|---|---|---|
| 5,612,579 | A * | 3/1997 | Wisbey | B64D 41/00 |
| | | | | 290/4 R |
| 6,388,894 | B1 * | 5/2002 | Paggi | H01H 71/082 |
| | | | | 318/759 |
| 6,476,697 | B2 * | 11/2002 | Swartzentruber | H01H 50/002 |
| | | | | 335/132 |
| 6,888,077 | B2 * | 5/2005 | Garcia | H01H 71/082 |
| | | | | 200/284 |
| 8,094,436 | B2 | 1/2012 | Mills et al. | |
| 8,749,956 | B2 * | 6/2014 | Guering | H02B 1/044 |
| | | | | 307/18 |
| 8,970,330 | B2 * | 3/2015 | Wu | 335/131 |
| 2001/0043014 | A1 * | 11/2001 | Pradier | H02B 1/04 |
| | | | | 307/147 |

* cited by examiner

ASSEMBLY OF COMPACTLY INTEGRATED CONTACTORS IN AN ELECTRICAL CORE

CROSS-REFERENCE TO RELATED APPLICATIONS

This is a continuation of International Application No. PCT/FR2012/053087, filed Dec. 27, 2012, which application claims priority to French Patent Application No. 1162544, filed Dec. 29, 2011, which are each incorporated herein by reference in their entirety.

TECHNICAL FIELD

The technical field relates to the integration of contactors into an electrical system, and more particularly an electrical center, situated for example in an aircraft nose cone.

BACKGROUND

In general terms, electrical systems are carrying out an increasing number of functions and becoming increasingly complex, which can be reflected in an increase in the number of internal components such as contactors (or circuit-breakers) managing and distributing the power allocated to consumers.

In particular, the electrical center of an aircraft, which manages and distributes electrical power to the aircraft as a whole, must include an increasing number of contactors, making it increasingly bulky and difficult to integrate into the electronics bay (E/E bay) located below the cockpit.

In an aircraft electrical center, a distinction is made in particular between power management contactors and distribution contactors. A contactor provided to receive current directly from a power generator is known as a power management contact or power contactor. For this reason it is dimensioned to withstand the occurrence of an electric arc resulting from a high current, when a circuit is opened or closed. Said contactor has a high breaking capacity and is capable of making or breaking high currents. A contactor that has a lower breaking capacity than a power contactor is known as a distribution contactor or auxiliary contactor. Such a contactor is placed in a circuit downstream of a power contactor, i.e. in an intermediate position between the power source and the elements to which it distributes the current. These contactors are dimensioned to withstand lower currents than those to be withstood by the power management contactors.

In the prior art, said contactors are integrated into electrical centers individually. Contactors of both types (power management and distribution) are arranged and fixed one by one on the bottom of the case constituting the cowling of the electrical center. Said case bottom is moreover divided into compartments using partitions so as to electrically isolate each of them.

The electrical connections between the contactors are made using cables, via electrical terminals or via rigid conductive bars (copper or aluminium).

Said conventional integration presents drawbacks.

Firstly, the cowling and the individual partitions of each contactor occupy significant space on the case bottom. Moreover, carrying out fixing the contactors individually requires time and effort. Finally, the fact that the contactors are all arranged in the same plane makes the electrical connections more complex, because it is then necessary for each cable supplying a contactor to pass round the others. This also results in a significant waste of space.

In addition, other objects, desirable features and characteristics will become apparent from the subsequent summary and detailed description, and the appended claims, taken in conjunction with the accompanying drawings and this background.

SUMMARY

The various teachings of the present disclosure aims to overcome at least one of these drawbacks.

To this end, the present disclosure relates to a set of contactors, comprising at least one power management contactor and one distribution contactor, said at least one power management contactor being fixed to a first support element, said at least one distribution contactor being held by a second support element, said power management contactor being situated between the first support element and the second support element.

This makes it possible in particular to significantly reduce the integration surface area of the contactors, which can be divided at least by two because the two types of contactors are stacked.

According to one embodiment, the first and second support elements extend respectively in a first and a second plane, the first and second planes being parallel to each other.

According to one embodiment, the first and the second support elements are stacked so as to constitute a multi-layer assembly.

According to one embodiment, said at least one power management contactor and said at least one distribution contactor are electrically connected via an electrical connection element situated between the first support element and the second support element.

This makes it possible to significantly simplify the electrical integration. As the supply to the contactors is direct and perpendicular to the plane of installation of the contactors, an electrical connection is obtained that is both short and simple. In addition, these arrangements make it possible to design connections of the rack type between the contactors situated on the first support element and those of the second support element, so as to ensure quick and safe removal.

Independently, the present disclosure also relates to a set of contactors arranged symmetrically on either side of a first axis, the contactors being mechanically connected using a mechanical connection element extending between two rows of contactors along the first axis.

Such an arrangement, which is much more compact than in the prior art, makes it possible to reduce the surface area dedicated to the contactors by at least half.

In order to obtain an even more compact arrangement, the contactors are arranged symmetrically on either side of a second axis perpendicular to the first. Said doubly symmetrical arrangement of the contactors around a common mechanical connection element (base) also facilitates a compact and simplified power supply to the contactors. The mechanical connection element can to this end hold electrical connection elements that connect the contactors to an element of connection to an energy source. Advantage is thus taken of the central volume for arranging the electrical connection elements that supply all the contactors without the need to pass around them.

More particularly, the connection element can extend at least partially between two contactors in the same row along the second axis.

Said architecture is also beneficial for the integration of the power outputs, which are made directly on the edge (lateral face) of the mechanical connection element, in other words practically in a straight line. Thus a large free surface area is available for their removal. The supply and power outputs can also be segregated, unlike with the usual arrangements.

Finally, the electrical disconnection of the set (or module) of contactors is greatly facilitated by the possible adoption of a rack-type connection arranged on the rear face of the module in order to provide the power supply.

In one example, the contactors are primary distribution contactors, carrying out the management of the first power level, the management of the inputs/outputs and the management of the inter-compartment and inter-center transfers.

Independently, the present disclosure also relates to a set of contactors grouped together into a module, each contactor providing a function of establishing a contact, characterized by at least one common modular element suitable for carrying out a given function different from the function of establishing a contact.

It will be noted that the function of establishing the contact can be provided within a contactor, in one example, by at least one of the following elements: a coil, a plunger, an arc box, main contacts, etc.

The common modular elements include the secondary elements of a contactor that allow it to be operated without having the function of establishing direct contact.

The advantages associated with these provisions are many. Firstly, they make it possible to reduce the volume associated with a set of contactors, dividing it by two or three depending on the solutions envisaged. Mounting the contactors is also greatly simplified, as it is only necessary to fasten a single common housing to the bottom of the cowling of an electrical center by means of a common base rather than a plurality of individual housings. Due to the sharing of certain functions associated with the contactors, the production costs are also reduced. For the same reasons, maintenance is simplified and therefore less costly. In particular, in the case of a breakdown, the common housing can simply be removed for replacement.

The electrical segregation of the contactors can be ensured if necessary by the presence of walls (partitions) separating two contactors.

In one example, the contactors are power management contactors, supplying consumers requiring high power.

According to one embodiment of the present disclosure, the common modular element is a common housing, or a common base holding said contactors and comprising means for fastening the module, or a modular data processing element for monitoring the state of the contactor, or a modular output connection element, or a modular power supply element.

In one example, an optical or proximity (induction sensor) device can be used for each contactor for monitoring the state of the contactors, the data processing for which will be provided by a common calculator situated on the periphery of the common housing. This device can also be integrated in the contact control device.

The present disclosure also relates to an assembly composed of an electrical connection plate and a set of contactors as defined above, the power supply to the contactors being provided via the electrical interconnection board. Thus, the electrical connection/disconnection of the module is greatly facilitated by this rack-type connection.

In particular, the fastening means of the module can fix the module to the electrical interconnection board. In this case, the electrical interconnection board is connected to a frame of the electrical center, which groups together the set of modules constituting said centre. Alternatively, the modules are fixed to the frame as well as the interconnection board.

The present disclosure also relates to a set of contactors comprising at least one power management contactor and one distribution contactor, said at least one power management contactor being fixed to a first support element, said at least one distribution contactor being held by a second support element, said power management contactor being situated between the first support element and the second support element, the distribution contactors comprising at least one set of contactors arranged symmetrically on either side of a first axis, the contactors being mechanically connected through a mechanical connection element extending between two rows of contactors along the first axis.

The present disclosure also relates to a set of contactors comprising at least one power management contactor and one distribution contactor, said at least one power management contactor being fixed to a first support element, said at least one distribution contactor being held by a second support element, said power management contactor being situated between the first support element and the second support element, the contactors comprising at least one set of contactors grouped together into a module, each contactor providing a function of establishing a contact, characterized by at least one common modular element suitable for carrying out a given function different from the function of establishing a contact.

The present disclosure also relates to an electrical center comprising a set of contactors comprising at least one power management contactor and one distribution contactor, said at least one power management contactor being fixed to a first support element, said at least one distribution contactor being held by a second support element, said power management contactor being situated between the first support element and the second support element, comprising at least one set of contactors arranged symmetrically on either side of a first axis, the contactors being mechanically connected through a mechanical connection element extending between two rows of contactors along the first axis, and at least one set of contactors grouped together into a module, each contactor providing a function of establishing a contact, characterized by at least one common modular element suitable for carrying out a given function different from the function of establishing a contact.

Finally, the present disclosure relates to an aircraft comprising at least one electrical center according to the various teachings of the present disclosure.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

An electrical center 1 according to the various teachings of the present disclosure comprises power management contactors 2 and distribution contactors 4.

More particularly, the power management contactors 2 are first-level power management contactors and the distribution contactors 4 are primary distribution contactors.

Figure 1:
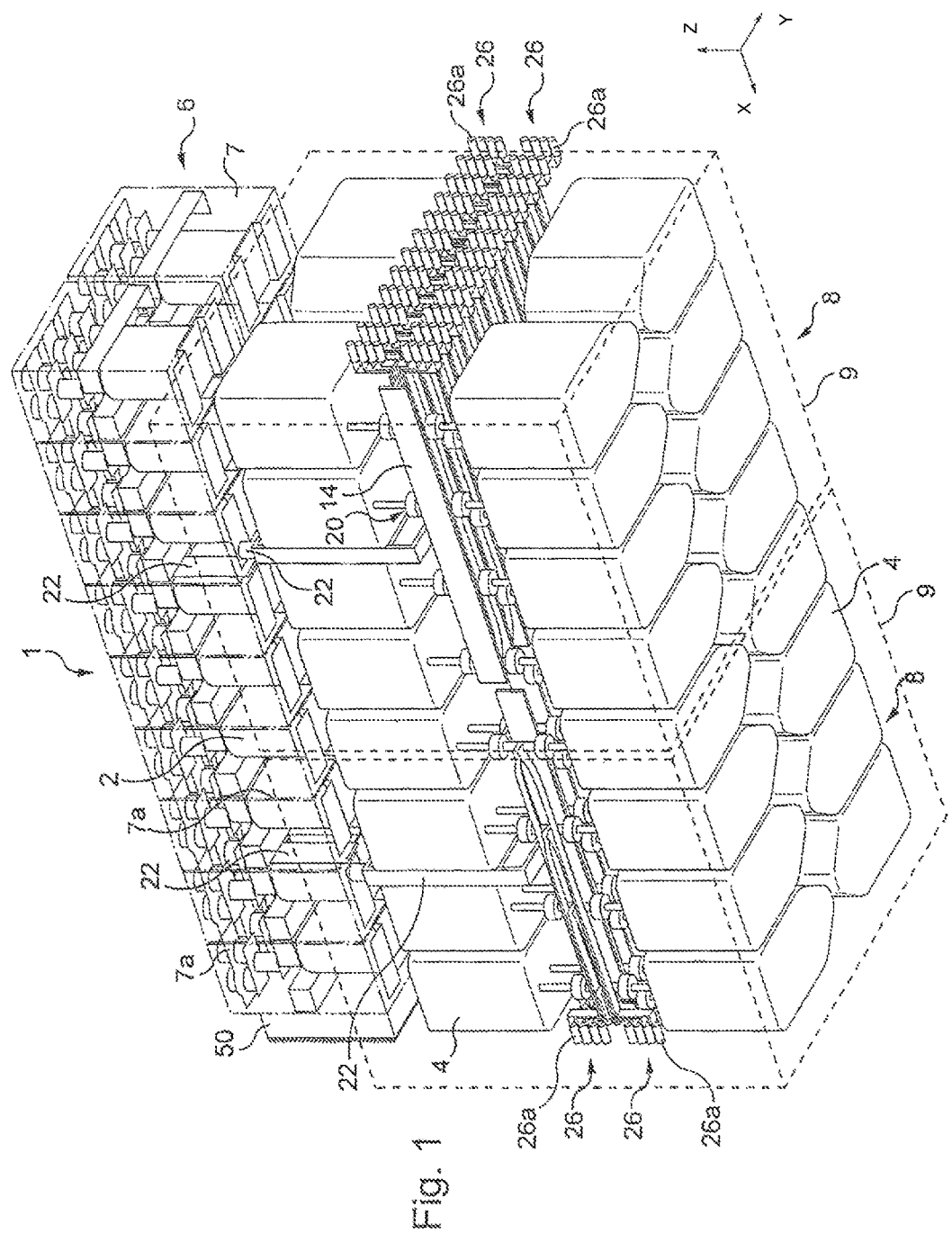
FIG. 1 is a diagrammatic perspective view of an electrical center according to the various teachings of the present disclosure in one embodiment.

In the embodiment shown in FIG. 1, the power management contactors 2 are grouped together into a power management module 6, and protected as a whole by a single management module housing 7. The distribution contactors 4 are divided into two (four in FIG. 1 and two in FIG. 2) groups of contactors or distribution modules 8, each of the modules being protected by a distribution module housing 9. It goes without saying that the number of modules of each type can vary.

Firstly, a description will be given of the arrangement of the sets of contactors with respect to each other.

Figure 2:
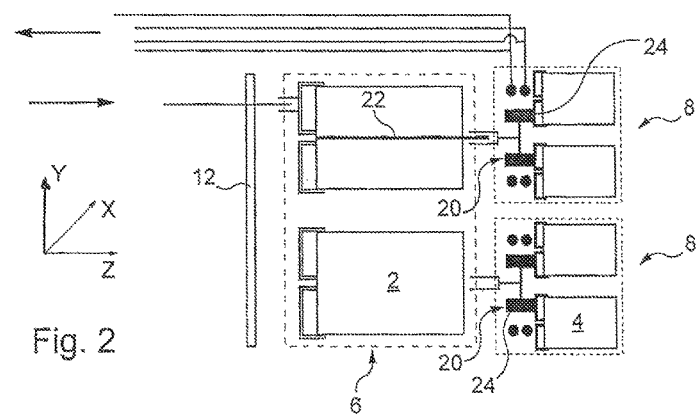
FIG. 2 is a diagrammatic plan view of a set of power management contactors and of a set of distribution contactors according to the various teachings of the present disclosure in one embodiment.

In the embodiments shown in FIGS. 1 and 2, the power management contactors 2 are fixed to a first support element 12 (not shown in FIG. 1) that extends in the plane XY in FIG. 2. As will be seen below, the first support element 12 can be equipped with fastening elements (not shown) comprising electrical supply elements.

Each distribution module 8 is held by a second support element 14 that extends in a plane parallel to the plane XY. It is therefore parallel to the first support element 12. In this case, the support elements 14 of the two distribution modules 8 are situated in the same plane.

The support elements 14 are positioned so that the power management contactors 2 are situated between the first support element 12 and the second support element 14. In other words, the first support element 12 and the second support elements 14 are stacked so as to constitute a multilayer assembly.

Each second support element 14 holds on at least one of its faces a plurality of distribution contactors 4. In the embodiment in FIG. 1, the second support element 14 holds distribution contactors 4 on both its faces. In the embodiment in FIG. 2, the second support element 14 holds contactors on the face opposite the power management contactors 2. It will be noted that the mechanical fastenings between the second support element 14 and the first support element 12 are not shown here.

The arrangement of the distribution contactors 4 into a distribution module 8 will now be described with reference to FIGS. 1, 3, 4 and 5.

Figure 3:
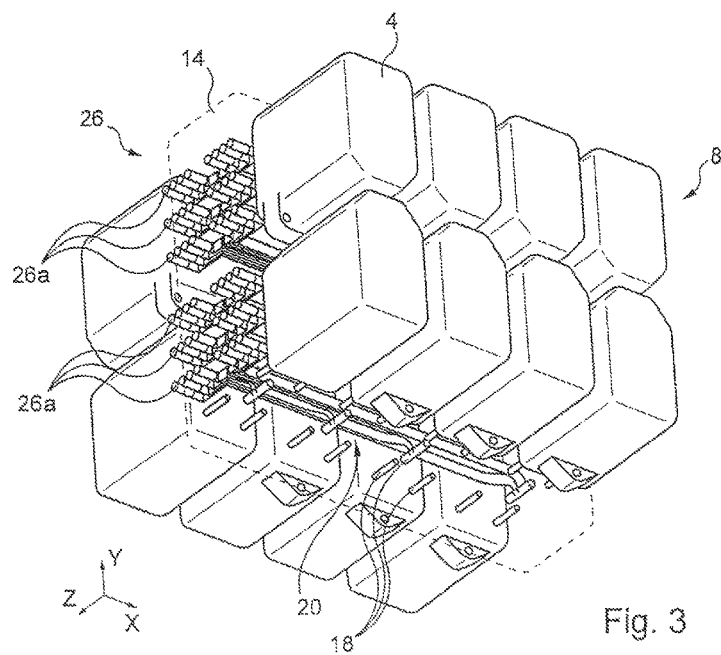
FIG. 3 is a diagrammatic perspective view of a set of distribution contactors according to the various teachings of the present disclosure.
Figure 4:
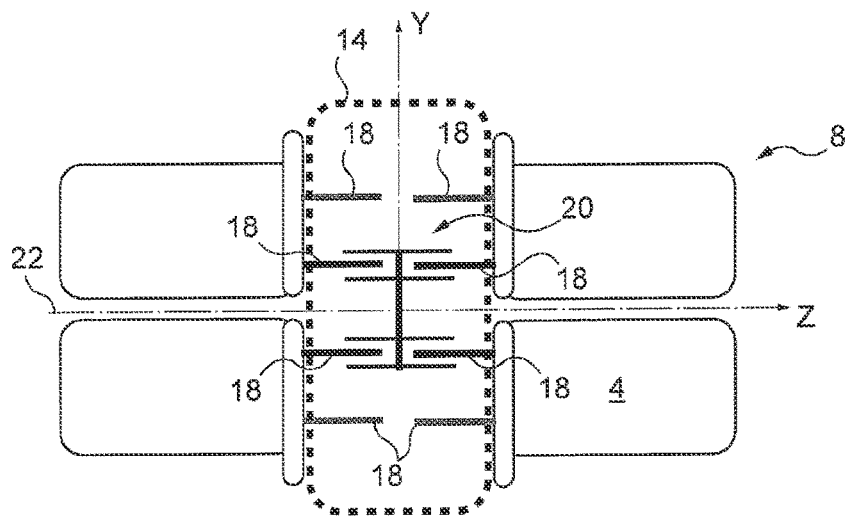
FIG. 4 is a diagrammatic cross-sectional view of the set of distribution contactors in FIG. 3.
Figure 5:
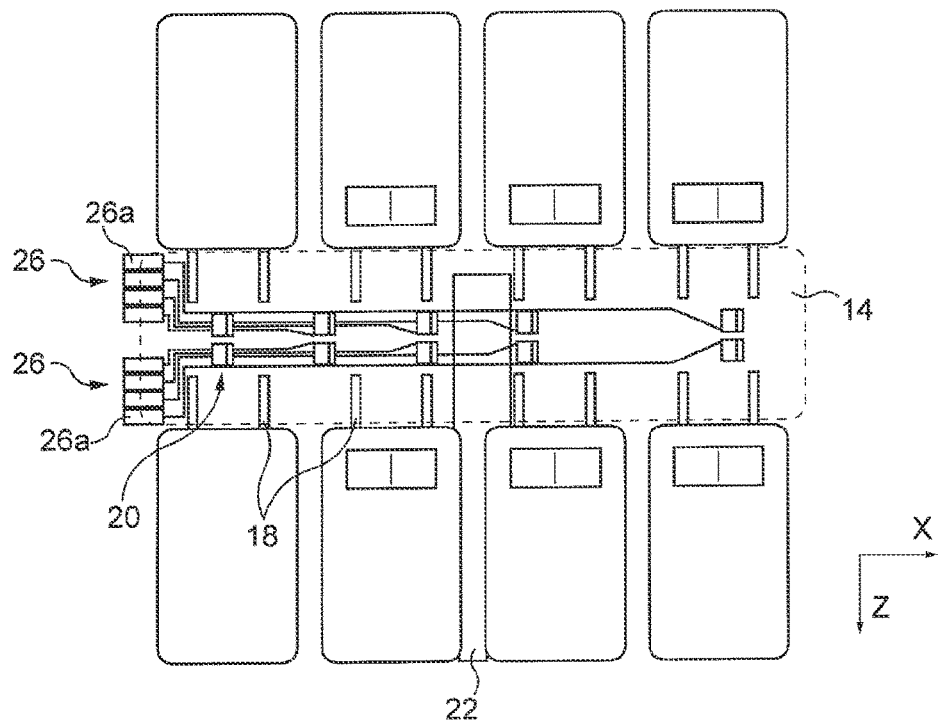
FIG. 5 is a diagrammatic plan view of the set of distribution contactors in FIG. 3.

FIGS. 3, 4 and 5 show a distribution module 8 similar to that in FIG. 1, although the number and form of the distribution contactors 4 are different. The principle of arrangement is however the same.

On the one hand, the distribution contactors 4 are arranged symmetrically on either side of a first axis, in this case the axis Y.

Thus, in the embodiment in FIGS. 3, 4 and 5, eight distribution contactors 4 are arranged on each face of the second support element 14 (which extends in the plane XY). On the other hand, the distribution contactors 4 are arranged symmetrically on either side of a second axis, in this case the axis Z. Thus, in FIGS. 3 to 5, eight contactors are arranged on either side of the plane XZ.

In order to provide this arrangement, the distribution contactors 4 are connected together via the second support element 14, which acts as a mechanical connection element, extending between two rows of distribution contactors 4. The mechanical connection (not shown) is made for example by three screws between each contactor and the second support element 14.

The "cluster" arrangement of the distribution contactors 4 around the support element 14 thus makes it possible to optimize the volume occupied by the distribution module 8. In addition, such arrangements allow a centralized power supply that is therefore simpler than the complex individual supply networks present in the prior art.

In addition to its mechanical connection function, the second support element 14 holds (or incorporates) an electrical connection element 20 that allows each distribution module 8 to be electrically connected to the power management module 10. In other words, a direct electrical connection is made to the electrical bars of the power management contactors 2.

To this end, each distribution contactor 4 comprises three pairs of pins 18 that are fixed to the second support element 14. The pins 18 are the electrical inputs and outputs of each contactor (three inputs and three outputs for a three-phase circuit).

The pins 18 extend from the inner face (opposite the second support element) of the contactor along the axis Z to the second support element 14 and are plugged into the electrical connection element 20.

In order to provide the connection to the electrical bars of the power management contactors 2, each electrical connection element comprises a connection element 22 (not shown in FIG.3) that extends perpendicularly to the plane of the second support element 14 toward the first support element 12 in the direction of the axis Z.

In the embodiment shown in FIG. 1, each distribution module 8 comprises a connection element 22. Each connection element 22 extends between two columns of distribution contactors 4 of a single distribution module 8, preferably between two columns situated towards the centre of the module.

In this case, from the standpoint of the plane XY and numbering the columns of each module in ascending order towards the right in FIG. 1: the connection element 22 of the distribution module 8 situated on the left of FIG. 1 is situated between the second and third column of distribution contactors, and the connection element 22 of the distribution module 8 situated on the right of the figure is situated between the sixth and seventh column of distribution contactors.

However, it goes without saying that a greater number of arms per module can of course be envisaged, as can an alternative positioning of the connection elements 22 for each distribution module 8.

Moreover, in the case of the second embodiment shown in FIG. 2, it will be noted that there is no need for the connection elements 22 to extend between two columns of distribution contactors 4 and they can therefore be positioned with greater freedom.

Each connection element 22 extends towards the first support element 12 from the second support element 14 along the axis Z, between two rows of distribution contactors 4.

As shown in FIG. 1, the connection element 22 extends between two management contactors 2. More precisely, in FIG. 1, the connection element 22 of the distribution module 8 situated on the left is situated between the second and third management contactor 2 and the connection element 22 of the distribution module 8 situated on the right is situated between the sixth and seventh management contactor 2.

However, it goes without saying that a greater number of connection elements per module can of course be envisaged, as can an alternative positioning of these elements with respect to the contactors of the module.

Moreover, the electrical connection element 20 comprises two output networks 26. Each output network 26 has the function of conveying the current from the distribution contactors 4 situated on one of the faces of the second support element 14 to the consumers (not shown).

Thus each output network 26 extends along the axis X in order to be able to serve each of the distribution contactors 4 as can be seen in particular in FIGS. 3 and 5. Each output network 26 also comprises a plurality of output terminals 26a that open out, on the outer edge of the second support element 14 (along the axis X) towards the outside of each support module 8.

Thus, in FIG. 1 the output terminals 26a of the distribution module 8 on the left of the figure extend towards the left of the figure and the output terminals of the distribution module 8 on the right extend towards the right.

Unlike the prior art, such an arrangement makes it possible to separate the power outputs from the supply.

The power management contactors 2 and the power management module 6 will now be described in detail with reference to FIGS. 6, 7 and 8.

Figure 6:
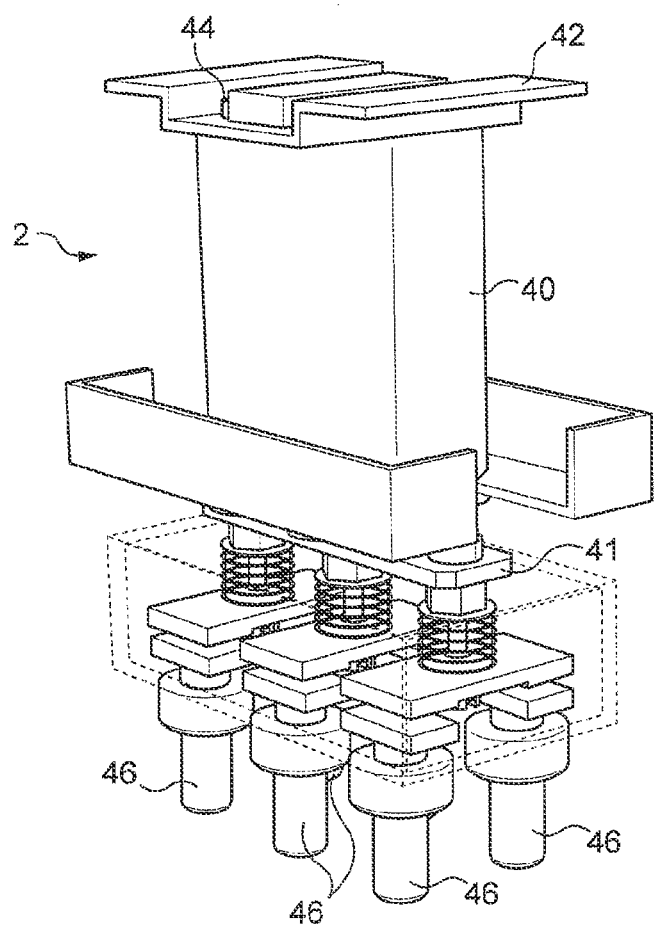
FIG. 6 is a diagrammatic perspective view of a power management contactor according to the various teachings of the present disclosure.

A power management contactor 2 as proposed here is reduced, as shown in FIG. 6, to the essential components allowing the contactor to operate. These components are known collectively as the primary functional part of the contactor.

Thus, such a power management contactor 4 comprises a coil 40, a mobile core (not shown), a plunger 41, a holding element 42, a state monitoring sensor 44 and six electrical terminals (three for supply and three for output) 46 (this number can vary).

It will be noted only that the state monitoring sensor 44 has the function of replacing the state-monitoring auxiliary contacts of the prior art, which are usually connected to a device for processing received data integrated into the power management contactor. As will be seen below, this device is shared with the other contactors of the management module 4.

Figure 7:
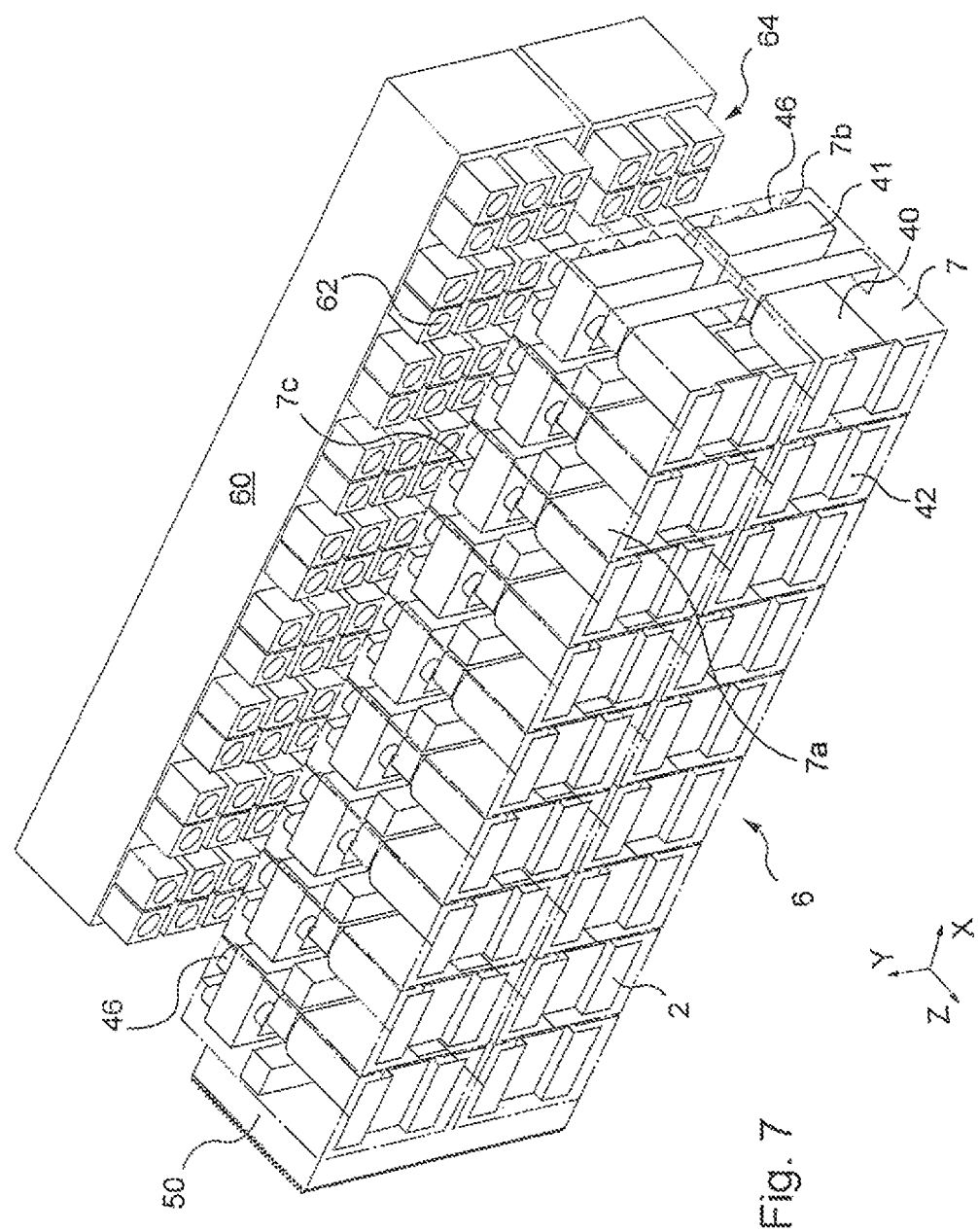
FIG. 7 is a diagrammatic perspective view of a set of contactors in FIG. 6 grouped together into a module and of an electrical interconnection board according to the various teachings of the present disclosure.

As seen in FIG. 7, the power management contactors 2 are grouped together side by side in the module 6 within a common housing 7. Said housing 7 is parallelepipedic in shape so as to provide an enclosure for the module 6. It comprises separation walls 7a, here produced in a single piece with the housing, situated between two power management contactors 2 in planes parallel to the plane YZ.

Alternatively, it is possible to include a partition. It is preferred to include in the application an intercalary separation partition that is removable but immobilized during assembly where necessary. Said partitions make it possible to separate the power management contactors 2 over their whole length along the axis Z.

Moreover, for each power management contactor 2, the contact terminals 46 are isolated from each other by horizontal isolating walls 7b shown in FIG. 7. These walls extend in the plane XZ.

Furthermore, the terminals 46 are isolated from each other by vertical isolating walls 7c parallel to the separation walls 7a. In this way, the walls 7a, 7b, 7c form a grid isolating each contact terminal 46 from the adjacent terminals on four sides.

Moreover, the management module 6 comprises a plurality of modular elements common to all the contactors, the functions of which are shared by them.

Thus the power management module 6 comprises a device 50 for processing contactor state monitoring data, the function of which is to process the data received by the state monitoring sensors 44 of each power management contactor 2 belonging to the management module 6 (the connections between the sensors and the device are not shown here). It will be noted that the device 50 can be integrated into, or even constitute, the control device of the contactors.

The power supply to the power management module 6 is provided in common, in particular through the electrical interconnection board 60 which, connected to an electric power generation network, is suitable for supplying power to the contact terminals 46. The manner in which the power is supplied to the board will not be detailed here, but it can in particular be fixed to a bottom wall of a cowling of an electrical center or integration surface of the frame.

Figure 8:
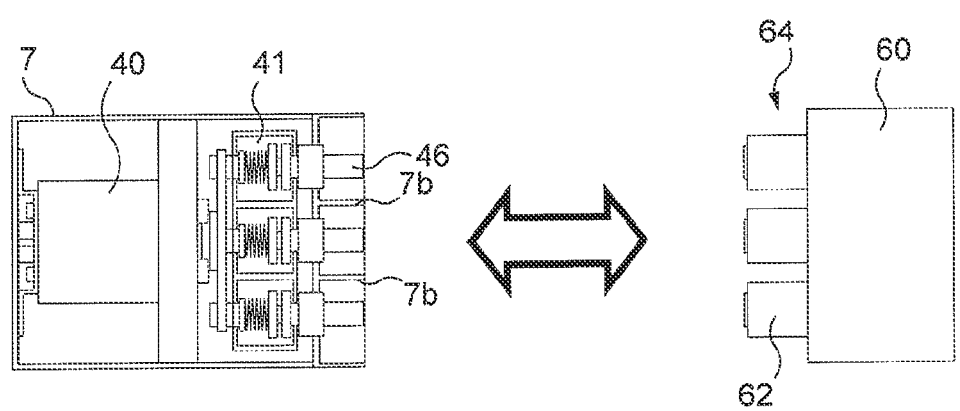
FIG. 8 is a diagrammatic cross-sectional view of the module and of the electrical interconnection board in FIG. 7.

To this end, as shown in particular in FIGS. 7 and 8, the electrical interconnection board 60, substantially parallelepipedic in shape, comprises a plurality of sockets 62 each intended to receive a contact terminal 46. For that reason, they are situated continuing on from the terminals along the axis Z.

In FIG. 8 an arrow indicates the insertion or removal of the contact terminals 46 into or from the sockets 62.

It will be observed that the sockets 62 are divided into clusters 64 of six sockets, so that the clusters receive all of the terminals of each power management contactor 2. However, as the number of terminals can vary from one embodiment to another, the size and number of sockets per cluster vary accordingly.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A set of contactors comprising:
a first plurality of contactors arranged on an electrical interconnection board; and
a second plurality of contactors symmetrically arranged in two rows mounted on either side of a mechanical connection element that extends between the two rows in a direction substantially parallel to the electrical interconnection board to thereby maintain the two rows of the second plurality of contactors in a stacked arrangement with the first plurality of contactors.

2. The set of contactors according to claim 1, wherein each of the two rows is arranged symmetrically on either side of an axis parallel to the mechanical connection element.

3. The set of contactors according to claim 1, wherein the mechanical connection element provides electrical power from the first plurality of contactors to the second plurality of contactors.

4. The set of contactors according to claim 3, further comprising an electrical connection element providing the electrical power to the mechanical connection element that extends from the mechanical connection element toward the electrical interconnection board.

5. The set of contactors according to claim 1, wherein the first plurality of contactors are power management contactors and the second plurality of contactors are primary distribution contactors.

6. A set of contactors, comprising:
at least one power management contactor that fixes to a first support element that supplies electrical power to the at least one power management contactor; and
at least one first distribution contactor held by a second support element on a side opposite to said power management contactor from the first support element so that the second support element supports the at least one first distribution contactor in a stacked arrangement with the at least one power management contactor,
wherein said at least one power management contactor and said at least one first distribution contactor are electrically connected via an electrical connection element situated between the first support element and the second support element.

7. The set of contactors according to claim 6, wherein the first and second support elements extend respectively in a first plane and in a second plane, the first and second planes being parallel to each other.

8. The set of contactors according to claim 7, wherein one or more second distribution contactors are held on a side of the second support element on a side opposite to the at least one first distribution contactor, and wherein the at least one power management contactor, the at least one first distribution contactor, and the one or more second distribution contactors constitute a multi-layer assembly rising vertically from the first support member.

9. An assembly comprising:
an electrical interconnection board;
a first set of contactors arranged on the electrical interconnection board and receiving electrical power therefrom; and
a second set of contactors arranged symmetrically into two rows mounted on either side of a mechanical connection element extending in a direction substantially parallel to the electrical interconnection board to thereby maintain the two rows of the second plurality of contactors in a stacked arrangement with the first plurality of contactors.

10. The assembly according to claim 9, wherein the first set of contactors is arranged into a power management module that adapts the electrical power received from the electrical interconnection board and wherein the second set of contactors is arranged into a distribution module configured to receive the adapted electrical power from the power management module for distribution to consumers via an output network of the distribution module.

11. The assembly according to claim 10, wherein the mechanical connection element is coupled to the power management module via an electrical connection element that supplies the adapted electrical power to the mechanical connection element, and wherein the mechanical connection element distributes the adapted electrical power to each of the second set of contactors in the distribution module.

12. An aircraft, comprising:
at least one electrical center that comprises:
a first set of contactors comprising a plurality of power management contactors fixed to a first support element and grouped together into a power management module, each contactor of the first set of contactors establishing a contact with the first support element to receive electrical power therefrom; and
a second set of contactors grouped together into a distribution module and held in a stacked arrangement with the first set of contactors by a second support element so that the power management module is situated between the first support element and the second support element,
wherein said power management module and said distribution module are electrically connected via an electrical connection element situated between the first support element and the second support element.

13. The aircraft according to claim 12, wherein the first and second support elements extend respectively in a first plane and a second plane, the first and second planes being parallel to each other.

14. The aircraft according to claim 12, wherein the first and the second support elements are vertically stacked so as to constitute a multi-layer assembly.

15. An integrated electrical core for supplying power from an electrical interconnection board to a plurality of consumers operating within an aircraft, the integrated electrical core comprising:
a power management module comprising a plurality of power management contactors, each of the power management contactors comprising a plurality of terminals that mechanically and electrically interface with the electrical interconnection board;
a distribution module stacked with the power management module on a side opposite to the electrical interconnection board, wherein the distribution module comprises a plurality of distribution contactors arranged on opposite sides of a support element and a network of output terminals at an end of the support element; and
an electrical connection element extending from the power management module to the support element of the distribution module to supply electrical power from the power management module to the distribution module for distribution to the plurality of consumers via the network of output terminals.

16. The integrated electrical core of claim 15, wherein each of the power management contactors comprises a coil to adapt a voltage of the electrical power supplied to the distribution module.

17. The integrated electrical core of claim 15, wherein the power management module forms a first vertical layer proximate to the electrical interconnection board and the distribution module forms a second vertical layer that is stacked proximate to the power management module on the side opposite to the electrical interconnection board.

18. The integrated electrical core of claim 15, wherein the power management module further comprises a sensor configured to detect a state of the power management module.

* * * * *